United States Patent [19]
Danowski

[11] Patent Number: 5,651,393
[45] Date of Patent: Jul. 29, 1997

[54] FLUID DIVERSION APPARATUS

[76] Inventor: Robert T. Danowski, 504 Wellwood Dr., Shirley, N.Y. 11967

[21] Appl. No.: 581,907

[22] Filed: Jan. 2, 1996

[51] Int. Cl.$^6$ .................................. F16L 55/12
[52] U.S. Cl. .................. 138/97; 138/89; 138/90; 138/93
[58] Field of Search .................. 138/97, 98, 89, 138/90, 110, 103, 93; 29/447, 523, 402.09; 228/119

[56] References Cited

U.S. PATENT DOCUMENTS

| | | | |
|---|---|---|---|
| 1,471,184 | 10/1923 | Miles | 138/97 |
| 1,747,933 | 2/1930 | Goodman et al. | 138/94 |
| 1,808,411 | 6/1931 | Hinkston | 138/90 X |
| 1,993,307 | 3/1935 | Nicholson | 138/89 |
| 2,375,995 | 5/1945 | Kaeser | 138/89 X |
| 2,543,954 | 3/1951 | Barber | 138/97 X |
| 2,731,041 | 1/1956 | Mueller et al. | 138/97 |
| 2,756,779 | 7/1956 | Tratzik et al. | |
| 2,773,554 | 12/1956 | Lindorf | 138/97 X |
| 2,855,003 | 10/1958 | Thaxton | 138/90 |
| 2,870,794 | 1/1959 | Thaxton | 138/90 |
| 2,974,685 | 3/1961 | Ver Nooy | 138/90 |
| 4,529,007 | 7/1985 | Goforth | 138/89 |
| 4,589,446 | 5/1986 | Allen | |
| 4,602,500 | 7/1986 | Kelly | 138/90 |
| 4,790,356 | 12/1988 | Tash | 138/93 |
| 5,152,311 | 10/1992 | McCreary | |
| 5,224,516 | 7/1993 | McGovern et al. | 138/97 |

*Primary Examiner*—Patrick Brinson
*Attorney, Agent, or Firm*—Michael I. Kroll

[57] ABSTRACT

A fluid diversion apparatus (10) comprising a structure (12) for sealing an interior surface (13) of a pipe (14), so as to stop residual water within the pipe (14) from reaching a distal free end (16) of the pipe (14). An assembly (18) is for inserting the sealing structure (12) within the pipe (14). A facility (20) is for diverting the residual water centrally through the pipe (14) away from the distal free end (16), so that a valve, male adaptor or fitting can be soldered to the distal free end (16) of the pipe (14).

7 Claims, 2 Drawing Sheets

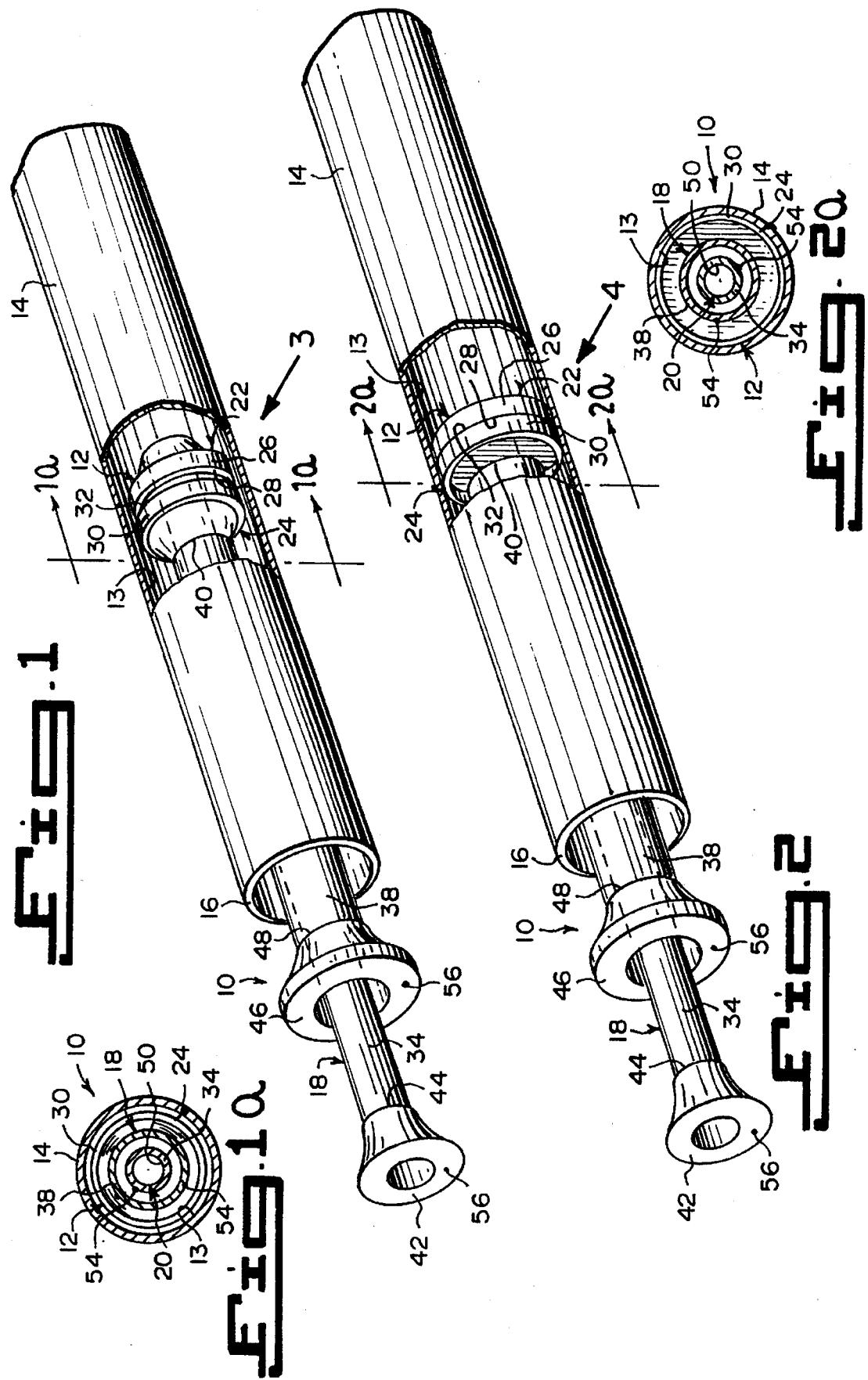

FLUID DIVERSION APPARATUS

BACKGROUND OF THE INVENTION

1. Field of the Invention

The instant invention relates generally to pipe by-pass devices and more specifically it relates to a fluid diversion apparatus.

2. Description of the Prior Art

Numerous pipe by-pass devices have been provided in prior art. For example, U.S. Pat. Nos. 2,543,954 to Barber; 2,756,779 to Tratzik et al.; 4,589,446 to Allen and 5,152,311 to McCreary all are illustrative of such prior art. While these units may be suitable for the particular purpose to which they address, they would not be as suitable for the purposes of the present invention as heretofore described.

BARBER, MERLINE

COMPRESSION BY-PASS AND WRENCH DEVICE

U.S. Pat. No. 2,543,954

A replacement for gas service pipes and the like, the same including a unitary open-ended tubular-by-pass fitting inserted in the old service pipe. The fitting having adjacent each end a surrounding holding and sealing gasket expansible radially and annularly outward into holding and sealing contact against the adjacent inner wall face of the service pipe. A means in the fitting as a structural part thereof, is for creating such expansion. The expansion-creating means is actuated for both the expanding effect and reversely thereof by a removable wrench device insertable for operation in the fitting.

TRATZIK, FREDERICK

BOWAN, WALTER J.

BY-PASS ASSEMBLY FOR SERVICE PIPE AND METHOD OF INSTALLATION

U.S. Pat. No. 2,756,779

A by-pass assembly for insertion into a service pipe to isolate the walls of a section thereof comprising: an open-ended, substantially integral tubular member interiorly unobstructed throughout its entire length and having no movable parts. The member is provided with ductile metal end portions of exterior and interior reduced diameter. The interior of the member between the end portions is of a diameter larger than the minimum interior diameter of the end portions. A yieldable annular gasket is mounted on each of said end portions and are of a diameter less than the interior diameter of the pipe. Radial expansion of the end portions by an expanding tool inserted in the member is adapted to force the gaskets into peripheral sealing engagement with the interior surface of the pipe.

ALLEN, GORDON L.

PIPE REPAIR BYPASS APPARATUS

U.S. Pat. No. 4,589,446

A pipe repair bypass apparatus which enables residual water in pipe to flow without touching the area of the pipe to be repaired by soldering, is disclosed. The bypass apparatus includes a flexible disc slightly greater in its outer diameter than the inner diameter of the pipe to be repaired. The disc has a central opening which receives one end of an elongated flexible tubing. A rigid tube is slideably arranged on the flexible tubing and serves to aid in inserting the disc and flexible tubing into the pipe to be repaired. When the apparatus is disposed inside a pipe, the disc acts as a dam for any water in the pipe with the water eventually flowing through the flexible tubing thereby avoiding the repair area.

McCREARY, ROBERT L.

METHOD FOR PREVENTING FLUID FROM REACHING A PORTION OF A PIPE

U.S. Pat. No. 5,152,311

The present invention is a method for preventing fluid from reaching a portion of a pipe to permit soldering of a threaded adaptor or valve onto the pipe. The method includes the first step of inserting a hollow member through the adaptor or valve. Next, there is the step of inserting the hollow member with an expansion sleeve into the pipe. Then, there is the step of expanding the expansion sleeve such that the expansion sleeve forms a seal in the pipe and fluid from a fluid source upstream of the sleeve is diverted through the hollow member past the portion of the pipe and soldering the threaded adaptor or valve onto the portion of the pipe. The present invention is also a method for preventing water from reaching a portion of a pipe to permit soldering of a threaded adaptor or valve onto the pipe. The method includes the first step of inserting a hollow member through the threaded adaptor or valve. Next, there is the step of inserting the hollow member with an expansion sleeve into the pipe. Then, there is the step of expanding the expansion sleeve such that the expansion sleeve forms a seal in the pipe and water is diverted through the hollow member past the portion of the pipe and soldering the threaded adaptor or valve onto the portion of the pipe.

SUMMARY OF THE INVENTION

A primary object of the present invention is to provide a fluid diversion apparatus that will overcome the shortcomings of the prior art devices.

Another object is to provide a fluid diversion apparatus that will enable residual water in a pipe to flow out without reaching an area of the pipe, so as to allow a valve, male adaptor or fitting to be soldered to the pipe.

An additional object is to provide a fluid diversion apparatus in which two expansion gaskets on first and second tubing members are insertable into the pipe and can be expanded upstream in the pipe by pulling the first tube member outwardly from the second tube member in the pipe, so as to seal the pipe and divert the residual water out through the first tube member.

A further object is to provide a fluid diversion apparatus that is simple and easy to use.

A still further object is to provide a fluid diversion apparatus that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a perspective view with parts broken away and in section, showing the invention inserted into a pipe.

FIGURE 1a is a cross sectional view taken along line 1a—1a in FIG. 1.

FIG. 2 is a perspective view similar to FIG. 1, but showing the first and second expansion gaskets expanded to seal off the pipe to divert the residual water through the inner tube.

FIG. 2a is a cross sectional view taken along line 2a—2a in FIG. 2.

Similar reference characters denote corresponding features consistently throughout the attached drawings.

DETAILED DESCRIPTION OF THE PREFERRED EMBODIMENTS

Figure 3:
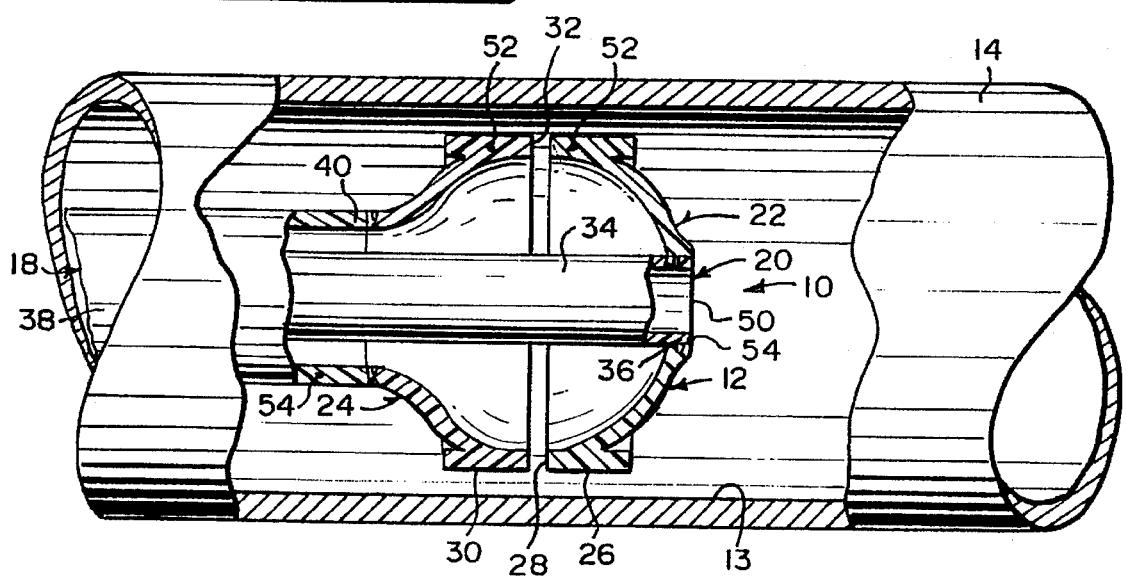
FIG. 3 is an enlarged elevational view taken in the direction of arrow 3 in FIG. 1, with parts broken away and in section.

Turning now descriptively to the drawings, in which similar reference characters denote similar elements throughout the several views, FIGS. 1 through 4 illustrate a fluid diversion apparatus 10 comprising a structure 12 for sealing an interior surface 13 of a pipe 14, so as to stop residual water within the pipe 14 from reaching a distal free end 16 of the pipe 14 an assembly 18 is for inserting the sealing structure 12 within the pipe 14. A facility 20 is for diverting the residual water centrally through the pipe 14 away from the distal free end 16, so that a valve, male adaptor or fitting (not shown) can be soldered to the distal free end 16 of the pipe 14.

The sealing structure 12 includes first and second expansion gaskets 22 and 24. The first expansion gasket 22 contains a first annular seat 26, which is slightly smaller in diameter than an inside diameter of the pipe 14 before the first expansion gasket 22 is expanded. A first annular contact surface 28 is about the first annular seat 26.

The second expansion gasket 24 consists of a second annular seat 30, which is slightly smaller in diameter than the inside diameter of the pipe 14 before the second expansion gasket 24 is expanded. A second annular contact surface 32 is about the second annular seat 30. The second annular contact surface 32 is positioned behind the first annular contact surface 28 of the first expansion gasket 22.

The inserting assembly 18 includes a first elongate tube member 34 having an inner end 36 attached centrally to the first expansion gasket 22. A second elongate tube member 38 fits over the first elongate tube member 34.

The second elongate tube member 38 has an inner end 40 attached generally to the second expansion gasket 24. The first elongate tube member 34 and the second elongate tube member 38 can insert the first expansion gasket 22 and the second expansion gasket 24 upstream from the distal free end 16 of the pipe 14.

The inserting assembly 18 further contains a first hollow hand grip 42 on an outer end 44 of the first elongate tube member 34. A second hollow hand grip 46 is on an outer end 48 of the second elongate tube member 38. A person can grasp the first hollow hand grip 42 and the second hollow hand grip 46 to help maneuver the first expansion gasket 22 and the second expansion gasket 24 into the pipe 14.

The diverting facility 20 consists of the first elongate tube member 34 having a port 50 in the inner end 36 which is attached centrally to the first expansion gasket 22. When the first elongate tube member 34 within the second elongate tube member 38 is pulley away from the distal free end 16 of the pipe 14, the first expansion gasket 22 will press against the second expansion gasket 24 to cause the first expansion gasket 22 and the second expansion gasket 24 to expand and seal off the interior surface 13 of the pipe 14, thereby diverting the residual water into the port 50 of the first elongate tube member 34 and out therefrom.

The first and second expansion gaskets 22 and 24 are each fabricated out of a flexible and expandable material 52. The flexible and expandable material 52 is soft pliable plastic.

The first and second elongate tube members 34 and 38 are each fabricated out of a durable strong material 54. The durable strong material 54 is copper metal, as shown in FIGS. 1a and 2a.

Figure 4:
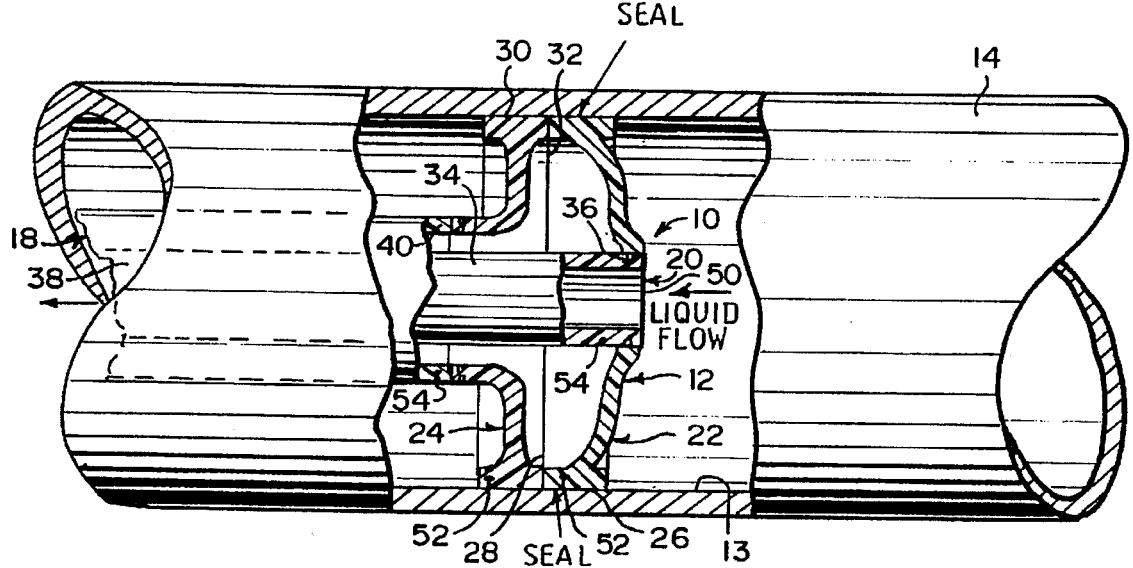
FIG. 4 is an enlarged elevational view taken in the direction of arrow 4 in FIG. 2, with parts broken away and in section.

The durable strong material 54 is hard stiff plastic, as shown in FIGS. 3 and 4. The first and second hollow hand grips 42 and 46 are fabricated out of rubber material 56.

LIST OF REFERENCE NUMBERS 10 fluid diversion apparatus
12 sealing structure of 10
13 interior surface of 14
14 pipe
16 distal free end of 14
18 inserting assembly of 10
20 diverting facility of 10
22 first expansion gasket of 12
24 second expansion gasket of 12
26 first annular seat of 22
28 first annular contact surface of 22
30 second annular seat of 24
32 second annular contact surface of 24
34 first elongate tube member of 18
36 inner end of 34 on 22
38 second elongate tube member of 18
40 inner end of 38 on 24
42 first hollow hand grip of 18 on 44
44 outer end of 34
46 second hollow hand grip of 18 on 48
48 outer end of 38
50 port in 36 for 20
52 flexible and expandable material for 22 and 24
54 durable strong material for 34 and 38
56 rubber material for 42 and 46

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Apparatus for diverting water from a distal, free end of a pipe comprising:

a) a first elongate tube extending into said pipe through said distal end having mounted on a first end of said first elongate tube within said pipe a first expansion gasket means for sealing upon expansion the inside of said pipe;

b) a second elongate tube fitted over and surrounding said first elongate tube extending into said pipe through said distal end and having mounted on a first end of said second elongate tube within said pipe a second expansion gasket means for sealing upon expansion the inside of said pipe downstream of said first expansion gasket means, said first and second elongate tubes being spaced from each other during their entire length;

c) each of said first and second expansion gasket means comprising a bulbous shaped member of flexible material with an annular contact surface which comes in contact with the inner surface of said pipe to block flow past said gasket means when the bulbous shaped members are compressed together within said pipe;

d) each of said first and second elongate pipes extending out said distal end of said pipe and having mounted on second ends respectively first and second hollow hand grip means axially spaced apart for manipulating said elongate pipes between compressing said bulbous shaped members together to close off the distal end of said pipe and separating said bulbous shaped members to permit flow out of the distal end of said pipe; and e) an opening into said first elongate tube through said first gasket means for permitting all flow in said pipe to pass out through said first elongate tube when said bulbous shaped members are compressed together to block flow out the distal end of said pipe.

2. A fluid diversion apparatus as recited in claim 1, wherein said first and second expansion gaskets are each fabricated out of a flexible and expandable material.

3. A fluid diversion apparatus as recited in claim 2, wherein said flexible and expandable material is soft pliable plastic.

4. A fluid diversion apparatus as recited in claim 1, wherein said first and second elongate tube members are each fabricated out of a durable strong material.

5. A fluid diversion apparatus as recited in claim 4, wherein said durable strong material is copper metal.

6. A fluid diversion apparatus as recited in claim 4, wherein said durable strong material is hard stiff plastic.

7. A fluid diversion apparatus as recited in claim 1, wherein said first and second hollow hand grips are fabricated out of rubber material.

\* \* \* \* \*